UNITED STATES PATENT OFFICE.

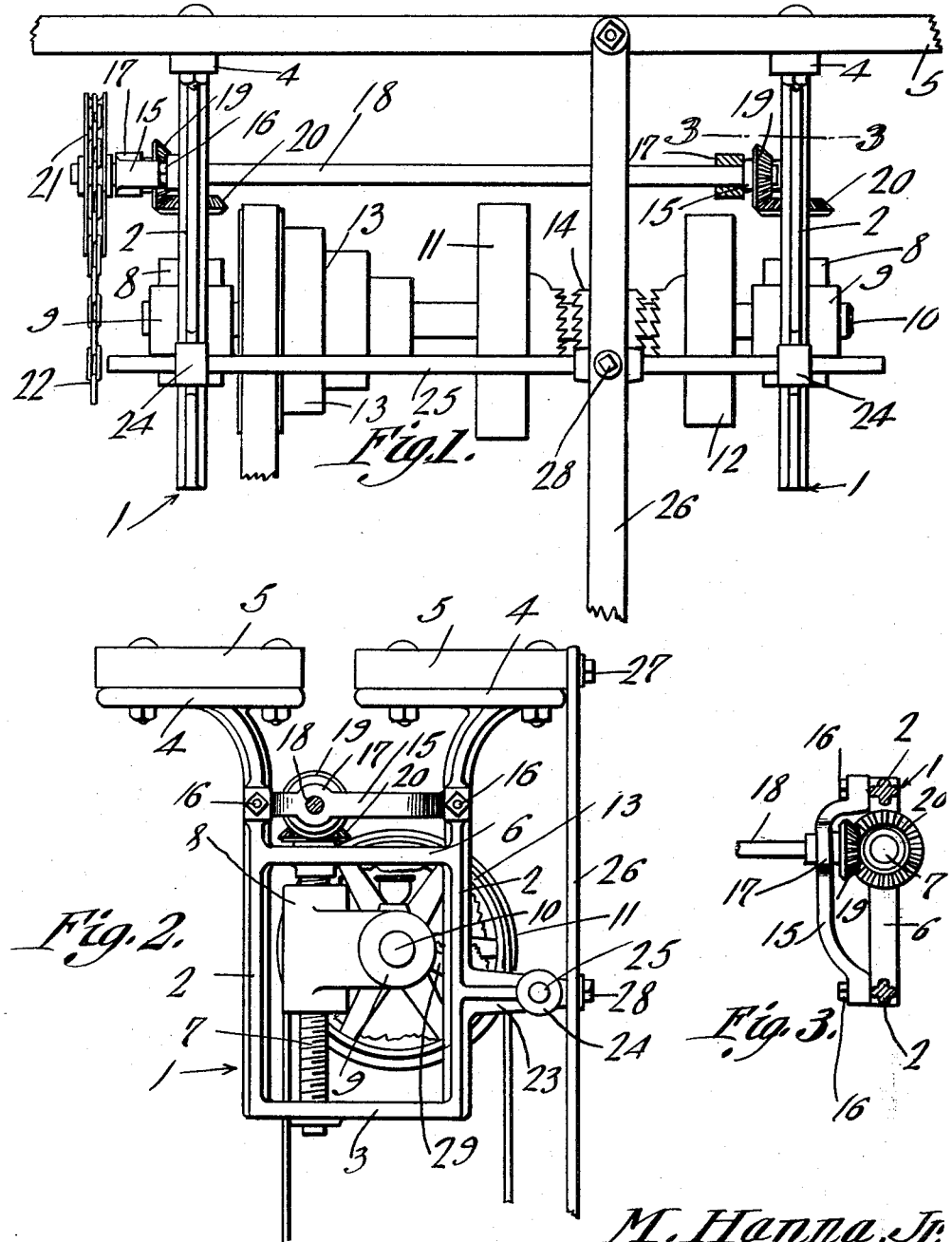

MICHEAL HANNA, JR., OF EARLINGTON, KENTUCKY.

ADJUSTABLE SHAFT-HANGER.

1,205,890.  Specification of Letters Patent.  Patented Nov. 21, 1916.

Application filed May 3, 1916. Serial No. 95,182.

*To all whom it may concern:*

Be it known that I, MICHEAL HANNA, Jr., a citizen of the United States, residing at Earlington, in the county of Hopkins and State of Kentucky, have invented a new and useful Adjustable Shaft-Hanger, of which the following is a specification.

The present invention appertains to shaft hangers, and aims to provide a novel and improved appliance of that character.

It is the object of the invention to provide a hanger having novel means for adjustably supporting a pulley or equivalent shaft, whereby the belt or belts can be tightened and loosened effectively and conveniently, the device including novel means whereby both ends of the shaft can be raised or lowered simultaneously.

It is also within the scope of the invention to provide an adjustable shaft hanger which is simple, compact and inexpensive in construction, and which will serve its office in a thoroughly satisfactory and desirable manner.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawing, wherein—

Figure 1 is a side view of the device. Fig. 2 is an end view thereof. Fig. 3 is a sectional detail taken on the line 3—3 of Fig. 1.

The present hanger is composed of two sections 1, which are preferably duplicates of one another, and each of which embodies vertical members 2 connected at their lower ends by cross pieces 3, and provided at their upper ends with flanges or plates 4 adapted to be bolted or otherwise fastened to supporting members or timbers 5 of any suitable sort, although the sections 1 can be hung from a ceiling or other overhead supporting structure. The members 2 of each section 1 are connected between their upper and lower ends with cross pieces 6.

Mounted within each hanger section 1 is a vertical screw 7 having its lower end journaled for rotation in the cross piece 3 and its upper end journaled through the cross piece 6, and a sleeve nut 8 is threaded upon each screw 7 and is provided at one side with a horizontal bearing 9. A countershaft 10 has its terminals journaled within the bearings 9 and is adjustably supported by the screws 7. The shaft 10 in fitting within the bearings 9, prevents the nuts 8 from rotating, although the bearings 9 can adjust themselves to aline with the shaft 10 and with one another.

Mounted loosely upon the shaft 10 are belt pulleys 11 and 12, which can be belted to a driving shaft, or the like, whereby said pulleys rotate in opposite directions, and a stepped pulley 13 is secured rigidly upon said shaft, and is adapted to be belted to the machine or other device which is to be operated by the shaft 10. A clutch box 14 is disposed between the pulleys 11 and 12 for alternately connecting said pulleys with the shaft 10 whereby the shaft can be rotated in either direction to operate the machine correspondingly.

Curved brackets 15 have their ends bolted or otherwise fastened, as at 16, to the members 2 of the sections 1 immediately above the cross pieces 6, and one of the brackets 15 is disposed upon the inner side of its section 1, while the other bracket is disposed upon the outer side of the corresponding bracket section. Said brackets 15 are provided with bearings 17 between their ends through which a shaft 18 parallel with the shaft 10 is journaled. Beveled gears 19 are attached to the shaft 18 adjacent the ends thereof and mesh with beveled gears 20 secured upon the upper ends of the screws 7, whereby when the shaft 18 is rotated, the two screws will be rotated simultaneously to move the bearings 8 either upwardly or downwardly in unison. The gear 19 adjacent the "inside" bracket 15 is disposed upon the outer side of said bracket, while the gear 19 adjacent the "outside" bracket 15 is disposed upon the inner side thereof, whereby when the shaft 18 is rotated, the screws 7 will be rotated properly to move the bearings 8 simultaneously in the same direction. Each gear 19 is within its bracket, the brackets of the two hanger sections being disposed in the same position.

As a means for rotating the shaft 18 from a lower point, a chain pulley 21 is secured upon one end of the shaft 18 adjacent the "outside" bracket 15 and an endless chain or other flexible element 22 extends around the pulley 21, and drops to a point whereby the chain can be conveniently operated for rotating the shaft 18 in either direction.

Certain limbs of the hanger sections 1 have outstanding brackets 23 provided with bearings 24 in which a sliding rod 25 is mounted, and a lever 26 extending downwardly to such a point where it can be conveniently operated has its upper end fulcrumed, as at 27, to the one of the members 5 or any other suitable support. The lever 26 is pivotally and slidably connected as at 28, with the rod 25, and said rod has an arm or other means 29 connected with the clutch box 14, whereby when the lever 26 is moved in one direction, the pulley 11 is connected to the shaft 10, when the lever is moved in the other direction pulley 12 will be connected with the shaft 10, and when the lever 26 is in an intermediate position, both of said pulleys 11 and 12 will be disconnected from the shaft 10.

By operating the chain or flexible element 22, it is an easy matter to adjust the bearings 8 for either tightening or loosening the belt passing over the stepped pulley.

Having thus described the invention, what is claimed as new is:

1. A hanger embodying a pair of screws, nuts threaded thereon and having bearings, a shaft journaled in said bearings, and means for operating said screws simultaneously.

2. A hanger embodying a pair of sections, a vertical screw carried by each section, a nut threaded upon each screw and having a bearing, a shaft journaled in the bearings, and means connected with said screws for rotating them simultaneously.

3. A hanger embodying a pair of sections, screws journaled to said sections parallel with one another, a nut threaded upon each screw and having a bearing at one side thereof arranged at right angles therewith, a shaft at one side of the screws journaled in said bearings, and means connected with said screws for rotating them simultaneously.

4. A hanger embodying a pair of sections having vertically spaced cross pieces, vertical screws journaled in said cross pieces, sleeve nuts threaded upon the screws between the cross pieces and provided at certain sides with horizontal bearings, a shaft journaled in said bearings, and means for rotating said screws simultaneously.

5. A hanger comprising a pair of hanger sections, each hanger section embodying vertical members having vertically spaced cross pieces, vertical screws journaled in said cross pieces, sleeve nuts threaded upon the screws between the cross pieces and provided at certain sides with horizontal bearings, a shaft journaled in said bearings, brackets attached to said members of the hanger sections above the upper cross pieces and having bearings between their ends, a shaft journaled in the last mentioned bearings, intermeshing bevel gears attached to the last mentioned shaft and the upper ends of the screws respectively, and means for rotating said shaft.

In testimony that I claim the foregoing as my own, I have hereto affixed my signature in the presence of two witnesses.

MICHEAL HANNA, Jr.

Witnesses:
KRESS SISK,
F. B. ARNOLD.

Copies of this patent may be obtained for five cents each, by addressing the "Commissioner of Patents, Washington, D. C."